(12) United States Patent
LaForgia

(10) Patent No.: US 8,693,768 B1
(45) Date of Patent: Apr. 8, 2014

(54) COSMETIC BASE MATCHING SYSTEM

(76) Inventor: Lisa LaForgia, Staten Island, NY (US)

( * ) Notice: Subject to any disclaimer, the term of this patent is extended or adjusted under 35 U.S.C. 154(b) by 83 days.

(21) Appl. No.: 13/545,206

(22) Filed: Jul. 10, 2012

(51) Int. Cl.
G06K 9/00 (2006.01)

(52) U.S. Cl.
USPC ............... 382/162; 382/165; 382/274; 222/1; 222/144.5

(58) Field of Classification Search
USPC .................. 382/162, 165, 167, 274; 348/453; 221/1; 222/1, 144.5
See application file for complete search history.

(56) References Cited

U.S. PATENT DOCUMENTS

| | | | |
|---|---|---|---|
| 6,293,284 B1 | 9/2001 | Rigg | |
| 7,079,158 B2 | 7/2006 | Lambertsen | |
| 2001/0037191 A1 | 11/2001 | Furuta et al. | |
| 2005/0036677 A1* | 2/2005 | Ladjevardi | 382/162 |
| 2007/0076013 A1* | 4/2007 | Campbell et al. | 345/589 |
| 2007/0258656 A1 | 11/2007 | Aarabi | |
| 2010/0067056 A1* | 3/2010 | Rich et al. | 358/2.1 |
| 2010/0271365 A1 | 10/2010 | Smith et al. | |
| 2011/0082764 A1 | 4/2011 | Flusser et al. | |

OTHER PUBLICATIONS

Keith Shaw, Japanese phone app analyzes facial skin conditions, website, May 21, 2012.

* cited by examiner

*Primary Examiner* — Ali Bayat
(74) *Attorney, Agent, or Firm* — Goldstein Law Offices, P.C.

(57) ABSTRACT

A system for matching a cosmetic base to a user's skin tone using a mobile device application. The system analyzes the user's skin tone from a captured image and determines a shade that matches the skin tone and that inconspicuously conceals a flaw or a blemish. The system instructs the user in lighting and dress so that a captured image is useful for analyzing skin tone. The system uses an app allowing the user to capture the image at home or in another convenient, discreet private location. The system allows the user to procure a commercially available matching shade, selectively providing a coupon, or order a custom manufactured matching shade. The system tracks orders and coupon redemption for a plurality of providers of cosmetic bases associated with the app.

20 Claims, 7 Drawing Sheets

COSMETIC BASE MATCHING SYSTEM

TECHNICAL FIELD

The present disclosure relates generally to a system for matching a cosmetic base to a user's skin color. More particularly, the present disclosure relates to a mobile device application that matches a cosmetic base to a user's skin color, concealing a flaw or a blemish inconspicuously and allowing the user to procure the same.

BACKGROUND

People wear makeup generally to enhance their appearance. Looking good makes a person feel good, even among people dealing with serious medical issues, such as cancer.

Women in particular generally apply a tinted cosmetic base, sometimes called foundation, to the face to even out the appearance and tone of the skin and then further apply color to the cheeks, eye area, lips and chin. When powder makeup is used, the foundation provides a surface to which powder clings so that frequent reapplication of the powder makeup is not needed. Women prefer that the base closely match their skin tone so that the face appears relatively natural, without a "made-up" or heavy mask appearance.

Women as well as men often wear makeup or a concealing preparation to mask scars, birthmarks, such as port wine stain, regretted tattoos, skin disease and changes in skin appearance due to climate, disease and aging. These preparations are called camouflage cosmetics and are used as cosmetic bases.

Generally, if a person needs camouflage cosmetics that effectively conceal without an artificial appearance, particularly if there is an underlying skin condition, it requires a visit to a dermatologist. The dermatologist evaluates the skin tone and any underlying condition, taking pictures and then forwarding the pictures to a custom cosmetology lab for matching. The lab prepares a product based on visual matching to a photo. When the user tries the first batch of product, it may not be satisfactory, possibly requiring new photos, additional visits to the doctors and a long period without a satisfactory product. The process is costly and time-consuming, and can be invasive when views of skin from different areas of the body are required.

If the user does not need camouflage cosmetics, but wants a tinted base to match her skin tone, a trip to a salon or a cosmetic counter in a department or specialty store is required. The user tries matching the base to the skin in the artificial light of the store, often unsuccessfully. Matching services are generally only available for expensive brands of makeup. The cosmetic counter experience is often intimidating, as a customer sits in the aisle of the store visible to all while the sales person applies different products to the skin. In the store, often the harsh lighting and the clothing the person is wearing distorts the matching process, resulting in a less than ideal match. As a consequence, the user has cosmetic bags and drawers filled with tinted cosmetic base that is close, but not close enough. Purchasing cosmetics through the trial and error method is expensive.

Many have proposed various forms of virtual makeovers, taking the digital image of the user and applying additional makeup such as lipstick and eye makeup, displaying possible results of cosmetic surgery, making wardrobe selections and the like.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF SUMMARY

An aspect of an example embodiment in the present disclosure is a system for properly capturing an image of a user for analyzing skin tone. Accordingly, an aspect of an example embodiment of the present disclosure is a system of instructions to a user for properly capturing images of the user, instructing the user in lighting and clothing so that a captured image is useful for analyzing skin tone.

A further aspect of an example embodiment of the present disclosure is a system for capturing an image of a user for analyzing skin tone in a convenient, discreet and private manner. Accordingly, an aspect of an example embodiment of the present disclosure is a system using an app on a mobile device, the mobile device instructing a user in capturing a proper image for analyzing skin tone, the mobile device capturing the image at home or in another convenient, discreet private location.

Another aspect of an example embodiment in the present disclosure is a system for analyzing skin tone of a user for matching to a cosmetic base. According, an aspect of an example embodiment of the present disclosure is a system that analyzes captured images of a user using a color matching program, determining if an available matching shade of cosmetic base exists and directing the user to a source of said matching shade for procurement.

The present disclosure describes a system for matching a cosmetic base to a user's skin tone using a mobile device application. The system analyzes the user's skin tone from a captured image and determines a shade that matches the skin tone and that inconspicuously conceals a flaw or a blemish. The system instructs the user in lighting and clothing so that a captured image is useful for analyzing skin tone. The system uses an app allowing the user to capture the image at home or in another convenient, discreet private location. The system allows the user to procure a commercially available matching shade, selectively providing a coupon, or order a custom manufactured matching shade. The system tracks orders and coupon redemption for a plurality of providers of cosmetic bases associated with the app.

In the present disclosure, the term mobile app (or mobile application) refers to a software application designed to run on mobile devices such as smartphones, tablet computers and other mobile devices presently available. Mobile apps are available through application distribution platforms, which are typically operated by the owner of the mobile operating system.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
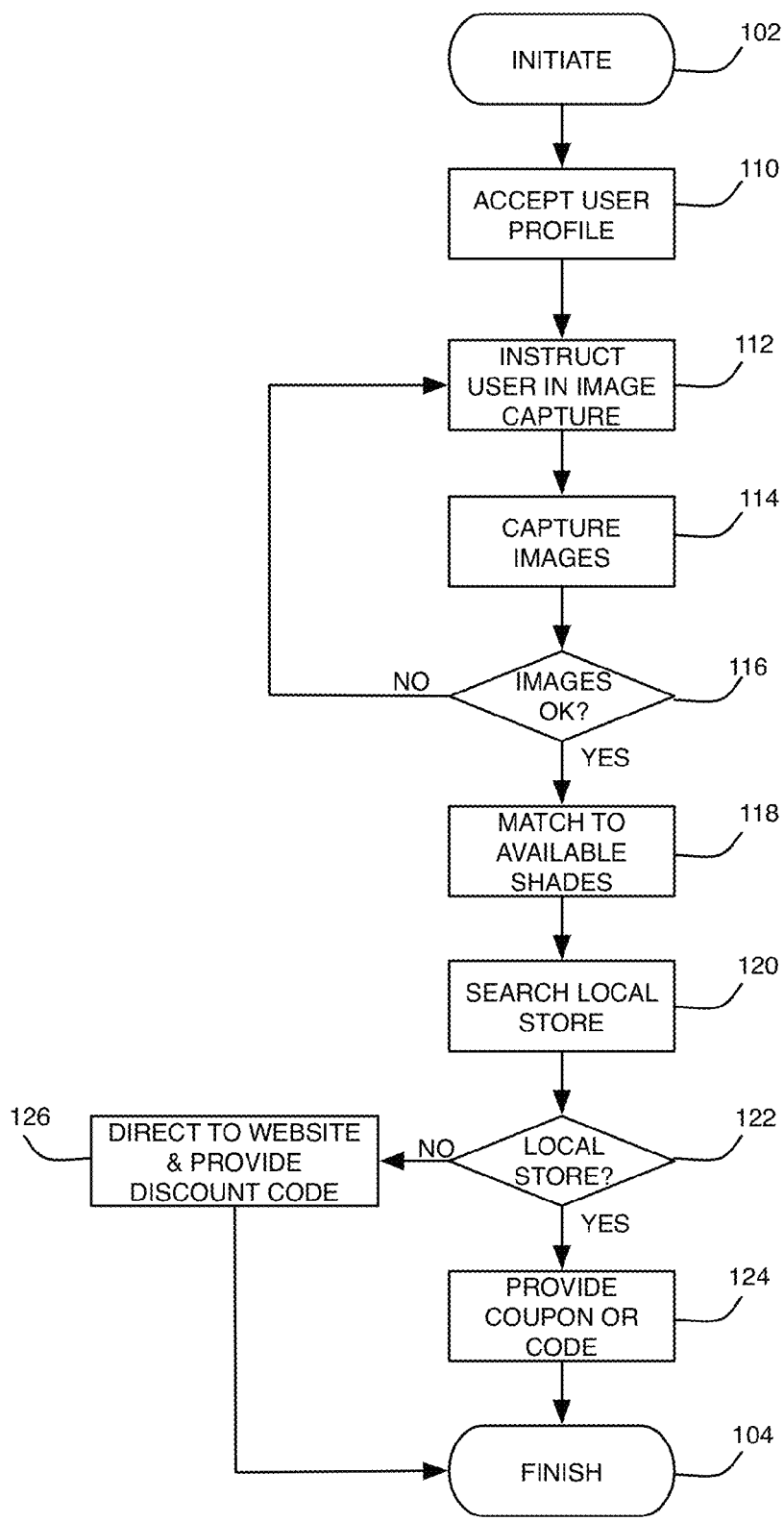
FIG. 1 is a flow chart showing a mobile device app for matching a cosmetic base to a user's skin tone and identifying a matching retail cosmetic base product.

FIG. 1 illustrates a flow chart for a system 100 for matching a cosmetic base to a user using a mobile app. The user has a body with a face, the body covered by skin having a tone. The skin has a plurality of areas, the tone of the skin varying on different areas of the face and body. Further, the user can have a flaw or blemish that he or she is desirous of concealing, the flaw having a different color than the surrounding skin tone. Using a mobile device having a camera function incorporated therein and a mobile app of the system, the mobile app operating on the mobile device, the user captures images for matching a cosmetic base to the skin tone of the area where the user is desirous to use a cosmetic base.

The user selects the mobile app and the mobile app starts 102. The mobile app requests and accepts the user profile information 110. Initially the user sets up a profile in the system that includes identifying information such as, for example, but not limited to, a user name, account information, location, preferences as well as relevant medical information such as, for example, but not limited to, an allergy, a special skin condition, any medication and use of sunblock. The use of medication is especially important because medication can affect the skin, making it drier, more sensitive and more prone to sun damage. Included in the profile is the skin area the user desires to cover with cosmetic base. The system accepts the profile initially and whenever the user selects the mobile app and enters the user name, the app accepts the user name and loads the user profile associated with the user name into the app.

The app instructs the user in how to correctly capture images of the user's skin that will accurately show the tone of the skin 112. The user is employing the system in a home or similar private location, without the benefit of professional studio lighting and background. The system instructs the user on lighting, clothing and background, displaying a plurality of instructions. In one embodiment, the mobile device is enabled with a voice synthesizer that audibly voices the instructions.

The app captures the images that the user shoots with the mobile device camera and stores the images in memory 114. The app determines if the images are acceptable for matching 116. If the images are not acceptable, the system repeats or modifies the instructions, further instructing the user 112 in order to provide acceptable images for color matching.

If the images are acceptable, the app analyzes the captured skin tones by a color matching program, matching the skin tone to a cosmetic base 118. The app accesses a database containing a plurality of commercially available brands of cosmetic bases and the shades available for each brand. The database associates a plurality of mathematically defined color values with each shade. Systems of mathematically defined color values, such as, as a non-limiting example, CIELAB or RGB, are well known to those of ordinary skill and a color value is easily converted between systems by a simple mathematical transformation.

The color matching program analyzes the skin tone in the captured images and defines the skin tone with mathematically defined color values, converting the values to the same system of color values for the shades of cosmetic bases stored in the database. The system finds the closest match of color values of the skin tone to the color values of the shades of cosmetic bases. The system identifies the shade and brand of the cosmetic base matching the user's skin tone.

The system searches a database containing a plurality of local stores and the commercially available brands associated with each store, the store selling those associated brands 120. In one embodiment, the database is on a server accessible through the Internet. In one embodiment, the user enters a present location to search to determine the local stores, further defining a distance for determining if a store is local. In a further embodiment, the app uses a native global positioning system in the mobile device to determine the present location of the phone and the user associated with it. The system determines if there is a local store 122 that has the matching shade of cosmetic base for sale and if there is at least one local store, provides a list of the at least one local store that has the matching cosmetic base for sale.

When the at least one local store has the matching base for sale, the app provides a discount for the purchase of the matching cosmetic base 124. In one embodiment, a scannable coupon is displayed on the mobile device. In a further embodiment, the discount is a code, such as non-limiting examples, an alphanumeric code, a QR (Quick Response) code, or a bar code. In a further example, the coupon is sent directly or indirectly by electronic means to a printer, the printer producing a paper copy of the coupon.

If the list of at least one a local store is a null set, the app directs the user to a website 126 that provides an opportunity to order the matching cosmetic base, the website accessible through the Internet. The system further provides a discount code to the user to reduce the cost of ordering the cosmetic base. The discounts provided to users by the system allow the system to track how often a user or a plurality of users procure cosmetic bases by using the system.

Once the system directs the user to a source for the matching cosmetic base, the system finishes 104.

Figure 2:
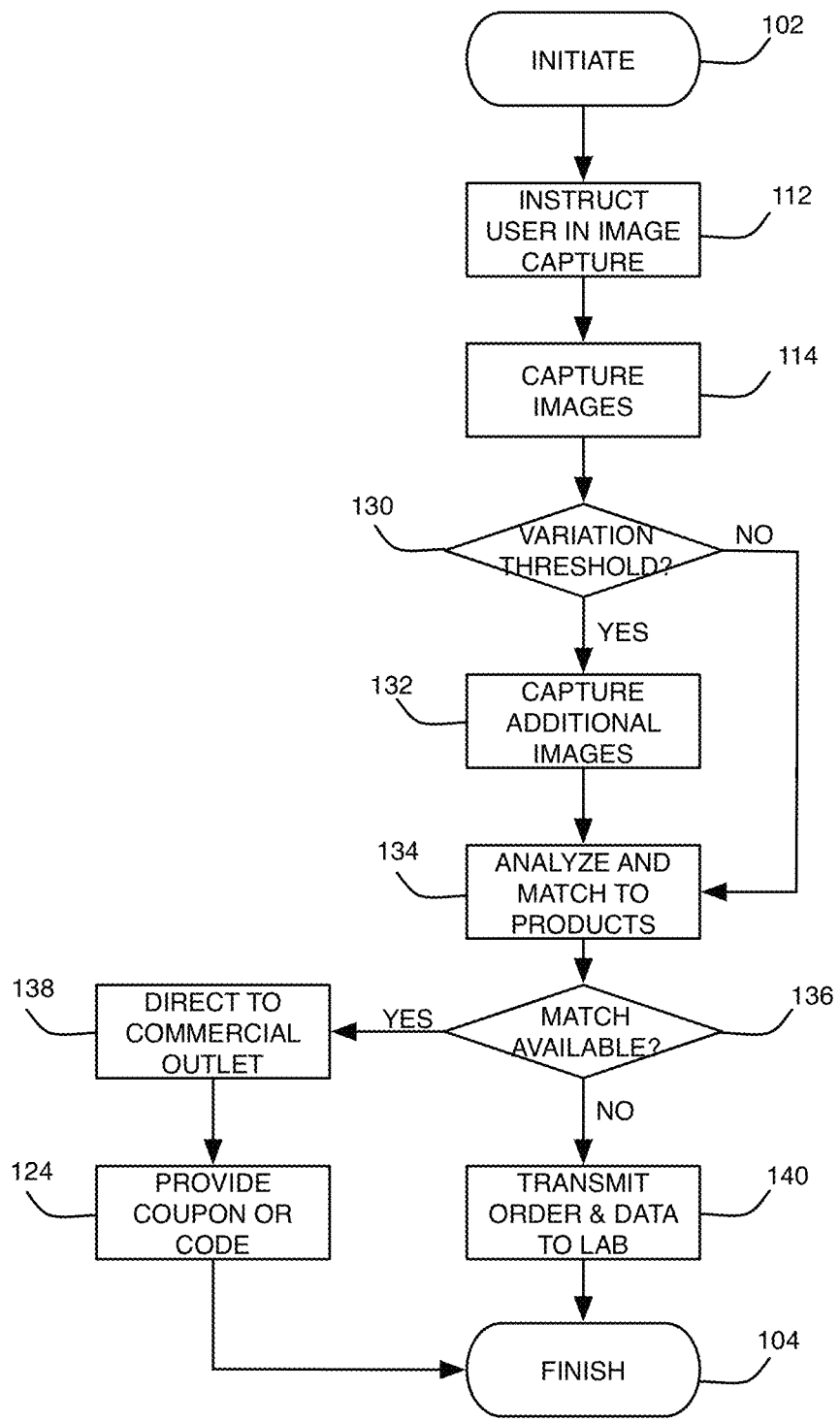
FIG. 2 is a flow chart showing the mobile device app analyzing a user's skin tone and identifying a matching retail cosmetic base product or ordering a custom cosmetic base product.

FIG. 2 illustrates the flow chart for a further embodiment of the system. The user initiates the system 102, including entering the user name or an initial profile. As explained herein above, the app instructs the user in image capture 112 and captures the images that the user shoots with the mobile device camera and stores the images in memory 114.

The app analyzes the captured skin tones by a color matching program by an area and determines if there is a variation within an image. Using the color matching program, skin tones in each area are assigned a plurality of numerical color values and a mathematical threshold for variation is preset for a difference within the image. If the difference in numerical color values between the areas exceeds the threshold 130 the system instructs the user to capture additional images in a specific manner 132.

Exceeding the variation threshold indicates that there is an imperfection such as, for example, but not limited to, blemishes, scars, birthmarks, such as port wine stain, varicose veins, spider veins, regretted tattoos, skin disease and changes in skin appearance due to climate, disease and aging. The user desires to conceal the flaw, blemish or imperfection with camouflage cosmetics. Camouflage cosmetics can require more than one cosmetic base. A first cosmetic base matches the base skin tone of the user. A second cosmetic base, when applied to the imperfection, masks the color variation of the imperfection, the second cosmetic base determined on a subtractive color model, which is well known to those of ordinary skill as a technique for masking a color to produce a neutral appearance. The second cosmetic base when applied to the imperfection results in the area of imperfection in the user's skin appearing matching the skin tone of the user in an area adjacent that is without the imperfection.

The app analyzes the images in order to match the first cosmetic base and define the second cosmetic base masking the area of imperfection 134. The app determines if a commercially available brand matches at least one of the cosmetics bases 136. If at least one matches a commercially available brand, the app directs the user to a commercial outlet 138 such as a local store or website and provides a discount code 124 as described hereinabove.

If at least one commercially available brand does not match at least one of the cosmetic bases, the result is a null set and an order is transmitted to a cosmetology lab for development of a customized cosmetic base 140 that matches the skin tone of the user. The images and color matching data are transmitted with the order 140. In a further embodiment, if the matching cosmetic base is not commercially available in the form or application method the user desires, the images and color matching data are transmitted with the order to the cosmetology lab for the desired form. As a non-limiting example, the commercial available brand is available only as a liquid that is applied by smoothing on without an applicator. The user desires an applicator package, an aerosol liquid or an aerosol foam for an airbrushed application onto the body, especially for the user having a pair of legs, a pair of arms or a décolletage area the user desires to cover with the cosmetic base. The app transmits the order, specifying the desired form. Once procurement is initiated, the system finishes the step 104.

Figure 3:
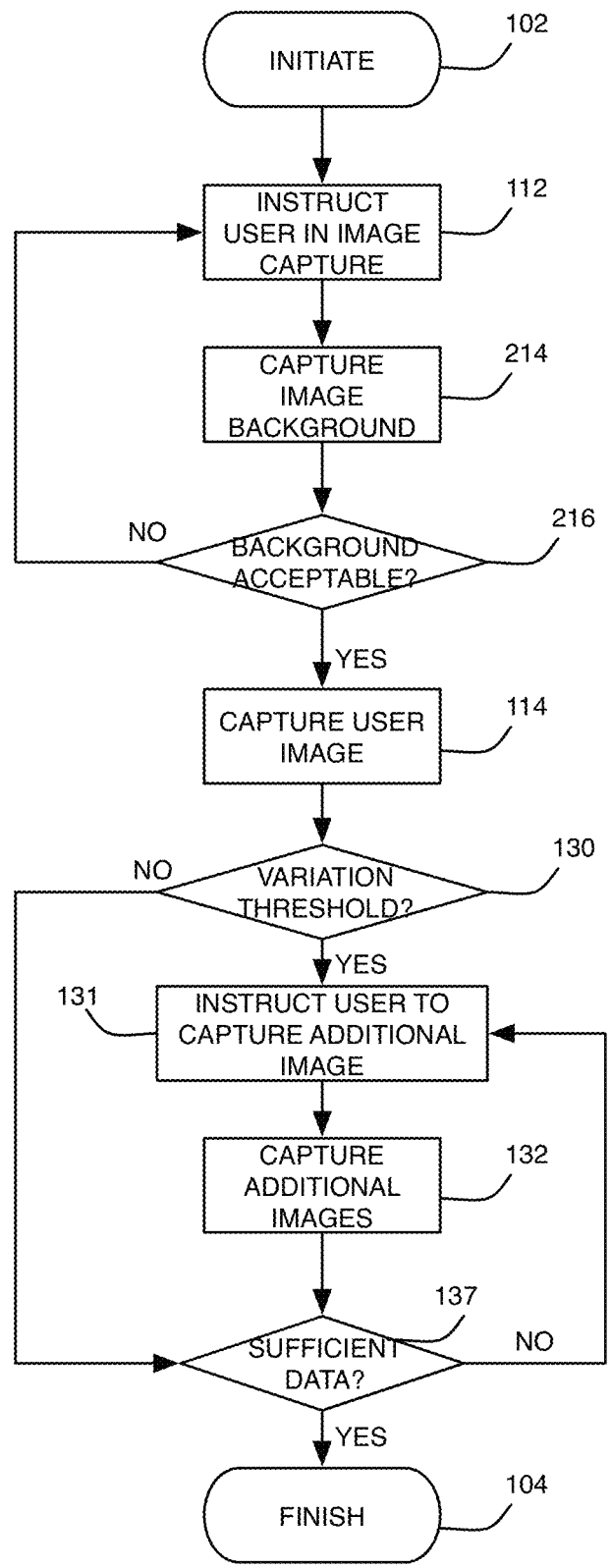
FIG. 3 is a flow chart showing the mobile device app in detail instructing the user on capturing images for analysis and matching.

FIG. 3 illustrates the flow chart for the further embodiment of the system, explaining in more detail the process for analyzing and capturing images. The user initiates the system 102 and the app instructs the user in how to set up lighting, clothing and background 112 as explained hereinabove.

The app instructs the user to capture the intended background with the lighting the user has set up for the image capturing session. The app captures the background for analysis 214. The app analyzes the background for sufficiency of light, for reflectiveness and neutrality 216. If the background is not acceptable, the user is further instructed in how to set up lighting, clothing and background 112. If the background is acceptable, the user is instructed to begin capturing images.

The app analyzes the captured skin tones by the color matching program and determines if there is a variation within an image as explained hereinabove. If the difference in numerical values between the areas exceeds the threshold 130 the app instructs the user to capture additional images in a specific manner 131 in order that the app has sufficient data for matching skin tone with commercial or customized products.

If the user does not have a variation with the image as explained hereinabove, generally because the user does not have a skin imperfection, the difference in numerical values between the areas does not exceed the threshold 130 and the app continues to determine if there is sufficient data from the captured images for matching 137.

If the variation does exceed the threshold, the user continues capturing images as instructed, capturing additional images for analysis 132. The app analyzes the data after the additional images have been captured to determine if there is sufficient data for matching with commercial or customized cosmetic bases 137.

Figure 4:
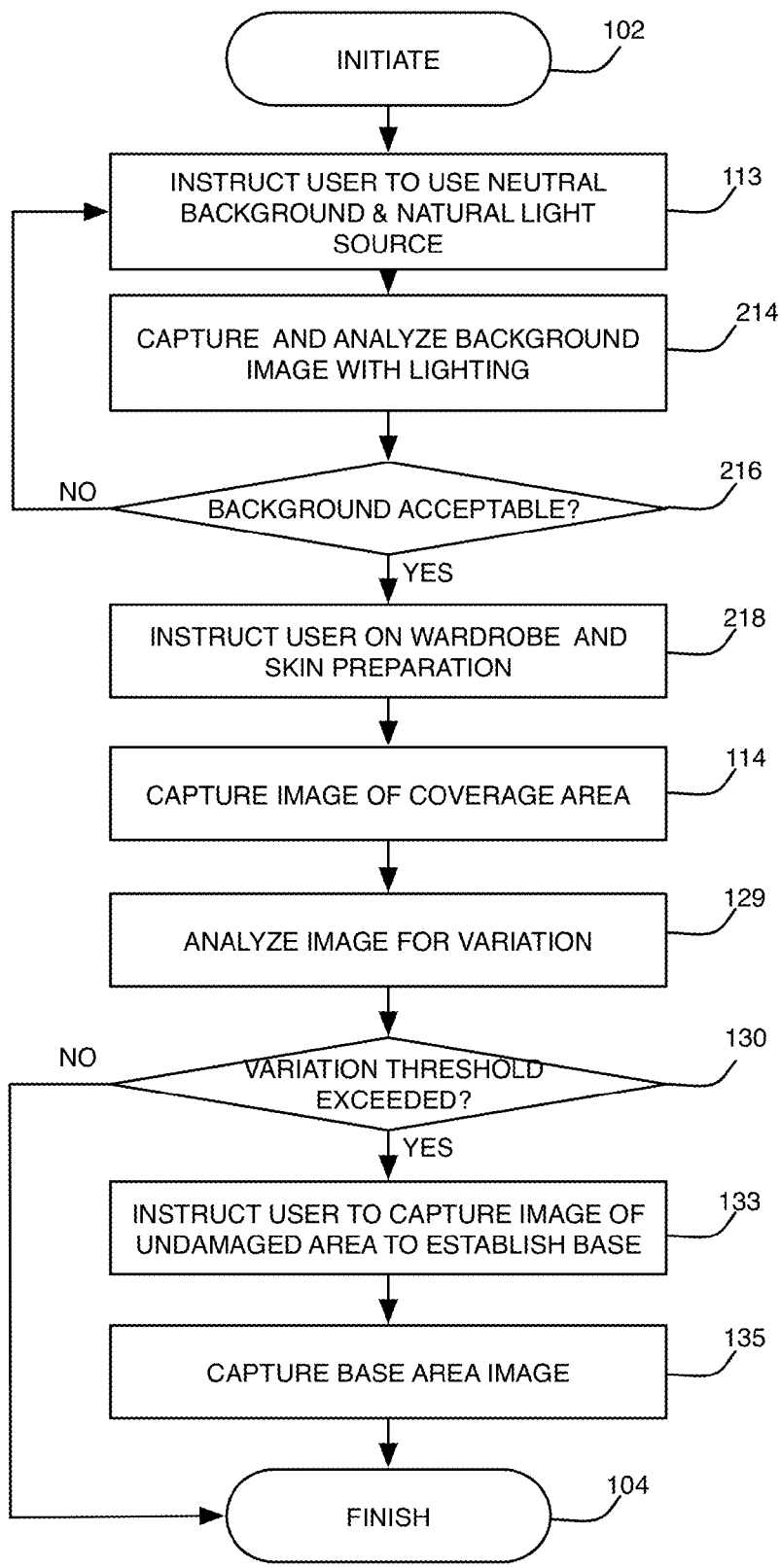
FIG. 4 is a flow chart showing the mobile device app in more detail instructing the user on capturing images for analysis and matching.

FIG. 4 illustrates the flow chart for instructing the user in capturing images, explaining in more detail the process for analyzing and capturing images. The app instructs the user to a color neutral background, preferably a non-reflective matt white with natural lighting for the image capturing session 113.

As a non-limiting example, the system instructs the user to provide a plurality of incandescent light bulbs having a total defined lumens and to place the user in front of a white non-reflective surface. In a further embodiment, the mobile device has an internal light meter associated with the camera, the light meter measuring the available light and instructing the user to add, subtract or reposition light bulbs.

As explained hereinabove, the app instructs the user to capture the background so that the app can analyze the background, determining that the user has set the background and lighting properly 214. The app analyzing the background and lighting, determining acceptability 216, including any available light meter readings. If the background is not acceptable, the app further instructs the user how to correct the background and lighting so that acceptable images can be captured 113.

If the background is acceptable, the app further instructs the user in preparing for capturing images for analysis and matching. The app instructs the user to wear a white fabric, either white clothing or draping the body in white cloth, such as a towel, sheet or other similar non-reflective cloth. Wearing any color clothing adjacent to the area of skin that the user is interested in matching will interfere with the image capture process. Color from the clothing reflects onto the skin and changes the tone. While this is well known to those of ordinary skill and many choose clothing color to enhance skin tone, it is important that the user not wear any clothing or drape having color during the image capture process. The system instructs the user on selecting the appropriate wardrobe. The system further instructs the user on cleansing the skin prior to image capture 218 so that all makeup, including previously applied base, moisturizers as well as natural skin oils so that the skin has a relatively matt finish and does not reflect light when the images are captured.

The app further instructs the user on the areas of skin to capture depending on which areas the user plans on using the cosmetic base. As a non-limiting example, if the user has a chest area having the imperfection, wanting to cover the imperfection on the chest area, the user enters as part of the profile as explained hereinabove. The app further instructs the user to drape the area of the imperfection for image capture 218.

When the user has followed the instructions and enters a ready response to the app, the app captures images of the areas that the user wants to cover 114. The system analyzes the images for variation in the image 129. If variation threshold is not exceeded 130 as explained Chereinabove, the app is finished with instructions and image capture 104.

If the variation threshold is exceeded 130, the app instructs the user to drape an area of skin adjacent to the area with the imperfection, preferably an area of skin that has a uniform skin tone with little or no variation, and has not been damaged by sun, medications or also has the same or a different imperfection. As a non-limiting example, the user has a stomach area without the imperfection and has the imperfection on the chest area. The app instructs the user to prepare the stomach for image capture to establish a base tone for the body area 133. The app captures the image of the base area 135. The app finishes the instructions and image capture steps 104.

Figure 5:
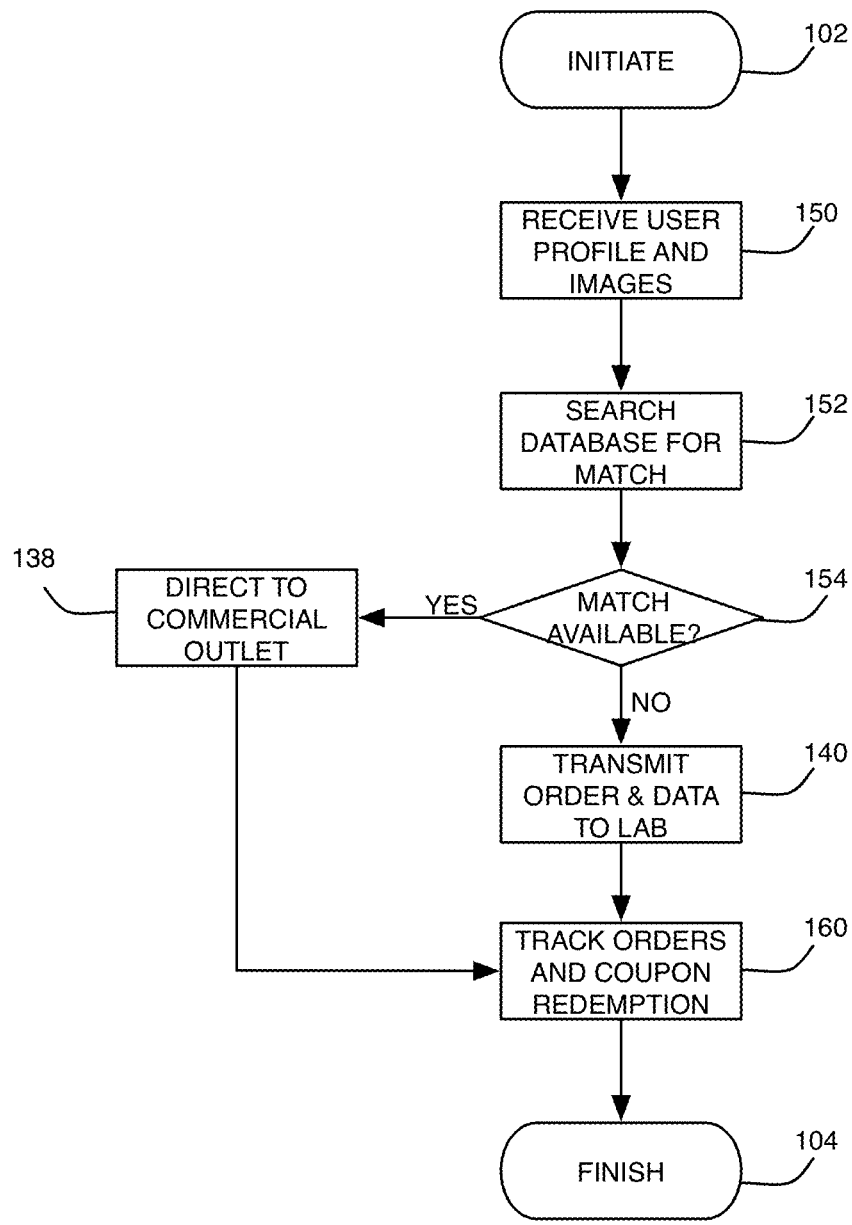
FIG. 5 is a flow chart showing the mobile device app selecting a method of procurement of a matching cosmetic base.

FIG. 5 illustrates a flow chart for the system, explaining in more detail the process for procuring the matching cosmetic base and further illustrates a method for tracking orders and referrals to a local stores, websites and cosmetology labs. In one embodiment, the system has an owner who allows the app to be freely downloaded onto a mobile device, the owner tracking orders and referrals and receiving a fee from the brands, the local stores, the websites and the cosmetology labs, based on the referrals.

The user initiates the app and the app receives, stores and analyzes the user profile and captured images as described in detailed steps hereinabove 150. The app searches the database for the match with the at least one commercially available brand, the database stored on the server accessed through the Internet. If at least one match is found, the system directs the user to procure the brand through the commercial outlet, such as for example, the local store or the website retailer, supplying the discount code or coupon to the user, thereby creating a referral. If there is no match to at least one cosmetic base, the system transmits an order to the cosmetology lab for custom compounding along with the skin tone matching data 160, thereby creating a referral. The system stores and tracks the coupons and discount codes redeemed at the commercial outlets and the orders sent to the cosmetology lab in the database for calculating the referrals and orders made through the system 160. The system selectively collects a fee from the commercial outlet based on the referrals and orders, finishing the step of tracking referrals and orders 104.

Figure 6:
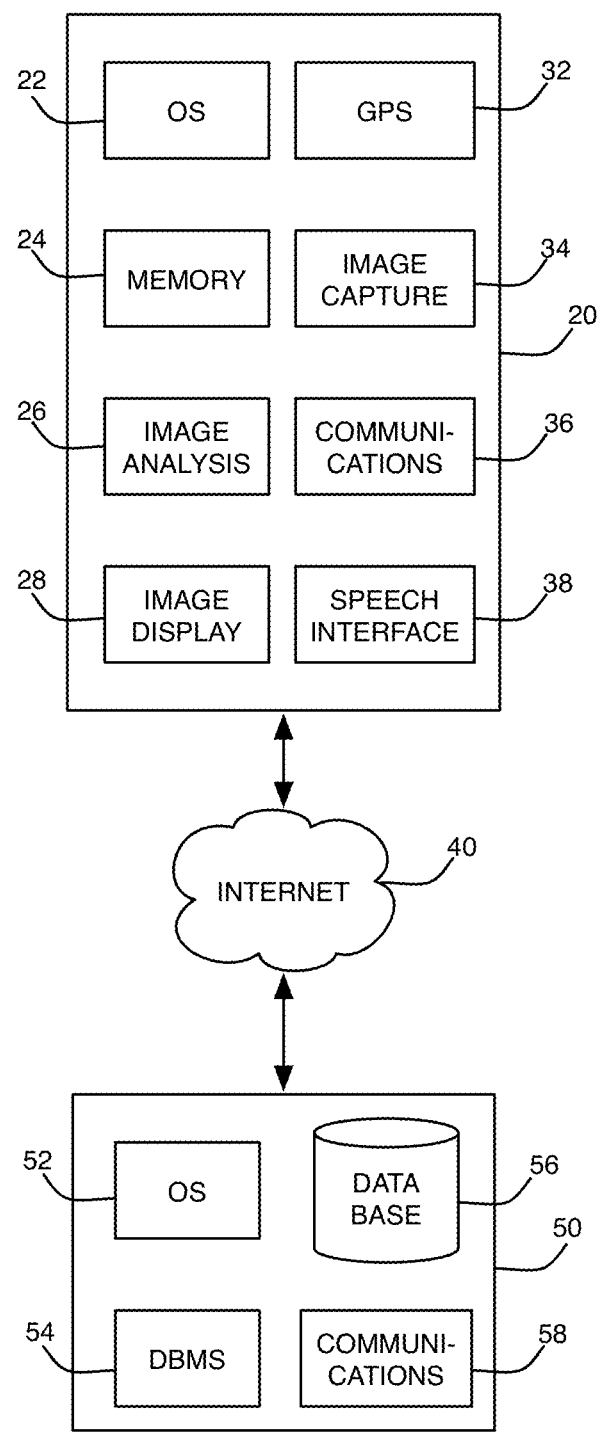
FIG. 6 is a block diagram of a cosmetic base matching system.

FIG. 6 is a block diagram of the cosmetic base matching system having a mobile device 20 connecting to a server 50 through the Internet 40. The mobile device 20 has an operating system 22, a memory function for storing a limited amount of data 24, an image analysis app for calculating the numerical color values of the captured images 26, an image display app that displays instructions and the captured images on the mobile device, the mobile device having a screen 28 for display, image capture app for taking photographic images, communications app that connect to and transmit data through the Internet 36, optionally a speech interface 38 having a voice synthesizer that audibly voices the instructions and optionally, a global positioning system (GPS) 32 for automatically entering the user's location into the system. It is understood by those of ordinary skill that a mobile device includes a smartphone, a tablet computer and other mobile devices presently available and subsequently available, while adhering to the principles of the present invention. It is further understood by those of ordinary skill that the mobile device has additional mobile apps that perform other functions not part of this disclosure.

The server 50 has an operating system 52, a data base 56 containing data on at least one commercially available brand of cosmetic base, at least one user and at least one cosmetology lab. The server has a database management system (DBMS) 54 and communications software 58 for connecting to and transferring data through the Internet 40. It is further understood by those of ordinary skill that the server has additional software that perform other functions not part of this disclosure.

Figure 7:
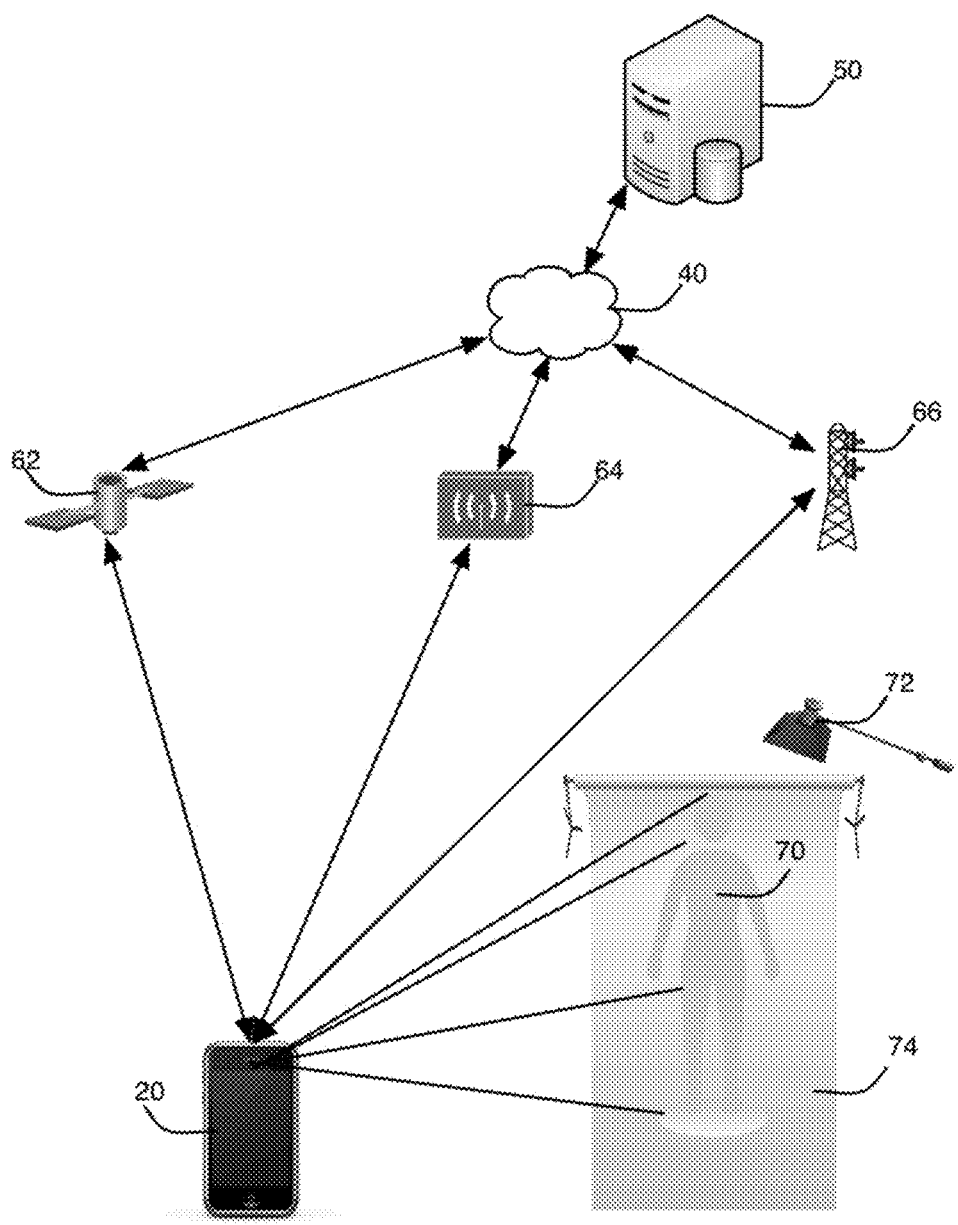
FIG. 7 is a schematic diagram of the cosmetic base matching system.

FIG. 7 is the schematic diagram of the cosmetic base matching system. The mobile device 20, here pictured as aniPhone® (iPhone® is the registered trademark of Apple Inc., Cupertino, Calif.) captures the image of the user 70, the user placed before an acceptable background 74 with acceptable lighting 72. The app on the mobile device transmits captured images, data and analysis to the Internet 40 through, for example, but not limited to, cellular communication 66, satellite communication 62 or wireless communication 64.

The images, data and analysis are communicated to the server 50 having the database and the server communicates further to the mobile device 20 with any matching brand of commercially available cosmetic base, the location of the nearest outlet or the that sells the brand, the website that sells the brand or alternatively transmits the order to the cosmetology lab (which is not shown in the Figure). The server 50 transmits to the mobile device through the Internet 40 using, for example, but not limited to, cellular communication 66, satellite communication 62 or wireless communication 64.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

It is further understood that, although ordinal terms, such as, "first," "second," "third," are used herein to describe various elements, these elements, should not be limited by these terms. These terms are only used to distinguish one element from another element. Thus, "a first element," discussed below could be termed a second element without departing from the teachings herein.

In conclusion, herein is presented a cosmetic base matching system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for matching a cosmetic base to a skin tone of a user using a mobile device, the mobile device having a camera for capturing images of the user having skin, the skin having a plurality of areas for covering by the cosmetic base, the images for use in matching a skin tone of the skin to the cosmetic base, the mobile device having an app having a color matching program, comprising:
   instructing a user in capturing a plurality of images so that the user captures acceptable images with the mobile device camera;
   capturing the images of the user;
   defining the skin tone in the captured images by a plurality of mathematically defined color values defined by a color matching program analyzing the images; and
   matching the mathematically defined color values of the skin tone to at least one shade of commercially available brand of cosmetic base by accessing through the Internet a database on a server, the database storing a plurality of mathematically defined color values associated with a plurality of shades, the shades associated with a plurality of commercially available brands of cosmetic base, the app matching the color values of the skin tone to the color values of the shades.

2. The method for matching a cosmetic base to a skin tone as described in claim 1, further comprising the step of receiving and accepting a user profile information before the step of instructing a user in capturing a plurality of images.

3. The method for matching a cosmetic base to a skin tone as described in claim 2, further comprising the step of determining if there is a local store that has the matching shade of cosmetic base for sale and if there is at least one local store, providing a list of the at least one local store that has the matching cosmetic base for sale after the step of matching the mathematically defined color values of the skin tone to at least one shade of the commercially available brand of cosmetic base.

4. The method for matching a cosmetic base to a skin tone as described in claim 3, further comprising the step of providing a discount for the purchase of the matching shade of the commercially available brand of cosmetic base, thereby creating a referral, following the step of determining if there is a local store that has the matching shade of cosmetic base for sale.

5. The method for matching a cosmetic base to a skin tone as described in claim 4, wherein the mobile device displays a scannable coupon.

6. The method for matching a cosmetic base to a skin tone of a user using an app running on a mobile device as described in claim 5, wherein after the step of displaying the scannable coupon, the coupon having been redeemed creating a referral, the mobile device transmits a redemption to the database, the database storing and tracking the referral.

7. The method for matching a cosmetic base to a skin tone as described in claim 3, wherein the step of determining if there is a local store that has the matching shade of cosmetic base for sale and providing the list of the at least one local store, the list containing a null set, is immediately followed by the step of directing the user to a website that provides an opportunity to order the matching cosmetic base, the website accessible through the Internet.

8. The method for matching a cosmetic base to a skin tone as described in claim 7, wherein the step of directing the user to a website that provides an opportunity to order the matching cosmetic base and the user ordering the cosmetic base, creating a referral, is followed by the step of the mobile device transmitting the referral to the database, the database storing and tracking the referral.

9. The method for matching a cosmetic base to a skin tone as described in claim 1, wherein the step of matching the mathematically defined color values of the skin tone to the mathematically defined color values of the shades of commercially available cosmetic bases produces a null set, is immediately followed by the step of transmitting an order to a cosmetology lab for development of a customized cosmetic base matching the skin tone of the user, thereby creating a referral.

10. The method for matching a cosmetic base to a skin tone of a user using an app running on a mobile device as described in claim 9, wherein the step of transmitting an order to a cosmetology lab is followed by the step of the mobile device transmitting the referral to the database, the database storing and tracking the referral.

11. A method using an app on a mobile device for setting an image capturing session for capturing images of a user having skin, the skin having a plurality of areas for covering by a cosmetic base, the images for use in matching a skin tone of the user to a cosmetic base using the app running on a mobile device, the app having a color matching program, the mobile device having a camera for capturing images, comprising:
   instructing a user in setting up a neutral background with a plurality of light bulbs for determining if the background and lighting is acceptable, and further instructing a user in wearing an acceptable white fabric and cleansing an area of skin for the image;
   analyzing a captured image of the background and lighting to determine if the background and lighting is acceptable and further instructing the user on setting up if the background and lighting is not acceptable;
   capturing images of the areas of skin of the user, the user placed in front of the background before the camera of the mobile device; and
   analyzing the captured images by the color matching program of the app, assigning a plurality of numerical values defining the skin tone of the areas of skin of the user, the numerical values of the skin tone for matching with a cosmetic base.

12. The method for matching the cosmetic base to the skin tone of the user using the mobile device as described in claim 11, wherein the step of the color matching program assigning the numerical values defining the skin tone of the areas of skin of the user is followed by the step of the color matching program further analyzes the numerical values within the image, determining a difference in numerical values within the image and determining if the difference in numerical values exceeds a preset mathematical threshold.

13. The method for matching the cosmetic base to the skin tone of the user using the mobile device as described in claim 12, wherein the step of determining if the difference in numerical values exceeds a preset mathematical threshold is followed by the step of instructing the user to capture additional images of areas of skin having uniform skin tone.

14. A system for matching a cosmetic base to a skin tone of a user, the user having skin, the skin having a plurality of areas for covering by a cosmetic base, comprising:
   a mobile device having a camera, the camera capturing a plurality of images of the skin of the user, the mobile device having an app for instructing the user in capturing images of skin and the app analyzing the images of the skin of the user using a color matching program, the app analyzing the skin and determining the tone of the skin in the images and assigning a plurality of numerical color values, the mobile device connecting to the Internet; and
   a server connected to the Internet, the server having a database, the database storing a plurality of numerical color values for a plurality of shades of a plurality of commercially available brands of cosmetic bases, the server having a database management system for searching the database, the database management system searching the database for numerical color values of the shades of commercially available brands of cosmetic bases matching the numerical color values of the skin tone of the skin of the user transmitted to the server from the mobile device in communication through the Internet.

15. The system for matching a cosmetic base to a skin tone of a user as described in claim 14, wherein the database contains a plurality of local stores and the commercially available brands associated with each store, the store selling those associated brands and the database management system determines if there is at least one matching shade of the commercially available cosmetic bases and determines if there is a local store that has the matching shade of cosmetic base for sale and if there is at least one local store, the server transmits a list of the at least one local store that has the matching cosmetic base for sale to the mobile device.

16. The system for matching a cosmetic base to a skin tone of a user as described in claim 15, wherein the mobile device has a display and the server further transmits a code for a scannable coupon for displaying on the mobile device, thereby giving the user a discount for the matching shade.

17. The system for matching a cosmetic base to a skin tone of a user as described in claim 15, wherein the mobile device has a global positioning system that identifies the location of the device, the mobile device transmitting the location for determining if there is local store near to the location that has the matching shade of cosmetic base for sale.

18. The system for matching a cosmetic base to a skin tone of a user as described in claim 17, wherein the mobile device presents a plurality of instructions for capturing images on the display.

19. The system for matching a cosmetic base to a skin tone of a user as described in claim 18, wherein the mobile device has a voice synthesizer that audibly voices the instructions for capturing images.

20. The system for matching a cosmetic base to a skin tone of a user as described in claim 18, wherein when the list of the at least one local store that has the matching cosmetic base for sale to the mobile device is a null set, the server transmitting an order to a cosmetology lab for a custom manufactured matching shade of cosmetic base.

* * * * *